(12) United States Patent
Osawa

(10) Patent No.: US 10,873,707 B2
(45) Date of Patent: Dec. 22, 2020

(54) IMAGE PICKUP APPARATUS AND METHOD, FOR ENSURING CORRECT COLOR TEMPERATURE BASED ON FIRST OR SECOND PRELIMINARY LIGHT EMISSION OF A FLASH DEVICE

(71) Applicant: CANON KABUSHIKI KAISHA, Tokyo (JP)

(72) Inventor: Toshifumi Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 16/050,254

(22) Filed: Jul. 31, 2018

(65) Prior Publication Data
US 2019/0045103 A1 Feb. 7, 2019

(30) Foreign Application Priority Data
Aug. 4, 2017 (JP) .................. 2017-151741

(51) Int. Cl.
*H04N 5/235* (2006.01)
*H04N 9/07* (2006.01)
*G03B 7/16* (2014.01)

(52) U.S. Cl.
CPC ............ *H04N 5/2354* (2013.01); *G03B 7/16* (2013.01); *H04N 5/2351* (2013.01); *H04N 5/2353* (2013.01); *H04N 9/07* (2013.01)

(58) Field of Classification Search
CPC .. H04N 5/2351; H04N 5/2353; H04N 5/2354; H04N 9/07; H04N 5/2356; G03B 7/16
(Continued)

(56) References Cited

U.S. PATENT DOCUMENTS

| 7,893,916 B2* | 2/2011 | Wei | ................. G09G 3/3406 250/200 |
| 8,619,155 B2* | 12/2013 | Nakagawara | .......... G03B 33/00 348/223.1 |

(Continued)

FOREIGN PATENT DOCUMENTS

| CN | 101516002 A | 8/2009 |
| CN | 103197492 A | 7/2013 |

(Continued)

OTHER PUBLICATIONS

Office Action issued in Chinese Application No. 201810884193.X dated Sep. 23, 2020. English translation provided.

*Primary Examiner* — Twyler L Haskins
*Assistant Examiner* — Akshay Trehan
(74) *Attorney, Agent, or Firm* — Rossi, Kimms & McDowell LLP

(57) ABSTRACT

An image pickup apparatus capable of ensuring the accuracy of a proper main light emission amount. A flash device can change an emission color temperature by changing a ratio of light emission between light sources different in emission color temperature. A photometry unit measures a luminance of light reflected from an object by preliminary light emission of the flash device. It is selected whether to perform second preliminary light emission at a color temperature changed according to at least one of spectral characteristics information of the light source, shooting condition information, and photometric value information obtained by first preliminary light emission, and determine a main light emission amount based on a photometric result obtained by second preliminary light emission, or to determine the main light emission amount based on a photometric result obtained by first preliminary light emission without performing second preliminary light emission.

9 Claims, 9 Drawing Sheets

(58) Field of Classification Search
USPC .......................... 348/223.1, 224.1, 370, 371
See application file for complete search history.

(56) References Cited

U.S. PATENT DOCUMENTS

| | | | |
|---|---|---|---|
| 2005/0001912 A1* | 1/2005 | Hoshuyama | H04N 9/045 |
| | | | 348/272 |
| 2007/0024720 A1* | 2/2007 | Awazu | H04N 9/735 |
| | | | 348/223.1 |
| 2009/0206235 A1* | 8/2009 | Guan | H04N 5/2351 |
| | | | 250/205 |
| 2009/0231463 A1* | 9/2009 | Hsieh | G03B 15/05 |
| | | | 348/224.1 |
| 2012/0026356 A1 | 2/2012 | Nakagawara | |
| 2013/0176482 A1* | 7/2013 | Hirasawa | G03B 7/16 |
| | | | 348/370 |

FOREIGN PATENT DOCUMENTS

| | | |
|---|---|---|
| JP | 2013015722 A | 1/2013 |
| JP | 2013101362 A | 5/2013 |
| TW | 200841293 A | 10/2008 |
| TW | 200951616 A | 12/2009 |

\* cited by examiner

FIG. 2A

| PD1 | PD2 | PD3 | PD4 | PD5 | PD6 | PD7 |
|---|---|---|---|---|---|---|
| PD8 | PD9 | PD10 | PD11 | PD12 | PD13 | PD14 |
| PD15 | PD16 | PD17 | PD18 | PD19 | PD20 | PD21 |
| PD22 | PD23 | PD24 | PD25 | PD26 | PD27 | PD28 |
| PD29 | PD30 | PD31 | PD32 | PD33 | PD34 | PD35 |

| B | G | B | G | B | G | B | G |
|---|---|---|---|---|---|---|---|
| G | R | G | R | G | R | G | R |
| B | G | B | G | B | G | B | G |
| G | R | G | R | G | R | G | R |
| B | G | B | G | B | G | B | G |
| G | R | G | R | G | R | G | R | ized shooting contribution, results in lowered con-
IMAGE PICKUP APPARATUS AND METHOD, FOR ENSURING CORRECT COLOR TEMPERATURE BASED ON FIRST OR SECOND PRELIMINARY LIGHT EMISSION OF A FLASH DEVICE

BACKGROUND OF THE INVENTION

Field of the Invention

The present invention relates to an image pickup apparatus, such as a film camera and a digital camera, equipped with a flash device, and more particularly to flash adjustment and color control for an image pickup apparatus equipped with a flash device that can change the color temperature of emitted light (emission color temperature).

Description of the Related Art

Image pickup apparatuses, such as a digital camera, include one equipped with a flash device which can change the emission color temperature. Conventionally, for the image pickup apparatus of this type, there has been proposed a technique for determining a light emission amount and an emission color temperature by measuring an object luminance and a color temperature of external light, or determining a light emission amount according to a result of preliminary light emission (see Japanese Laid-Open Patent Publication (Kokai) No. 2013-015722). Further, there has been proposed a technique for determining, in a case where the emission color temperature is different between preliminary light emission and main light emission, an amount of main light emission by correcting a calculated amount of light emission by using at least one of a difference in sensitivity of an image pickup device and a difference in reflectivity of an object based on the difference in color temperature between the main light emission and the preliminary light emission (see Japanese Laid-Open Patent Publication (Kokai) No. 2013-101362).

However, according to the technique disclosed in Japanese Laid-Open Patent Publication (Kokai) No. 2013-101362, it is possible to determine a correction value of the amount of main light emission based on information on the color temperature difference, with ease, only in a case where a light source has spectral characteristics equivalent or similar to those of a standard light source or a perfect radiator (black body).

FIG. 9 is a graph showing a relationship between a light wavelength and a relative light emission energy intensity of respective optical spectra of an incandescent lamp and a white LED. Referring to FIG. 9, s1 denotes an optical spectrum of the incandescent lamp substantially corresponding to a standard light source or a perfect radiator, and the optical spectrum of this light source has continuity but does not include emission line-like components. On the other hand, s2 denotes an optical spectrum of the white LED which has recently come to be widely used as an illumination light source, and the optical spectrum of this light source has spectral characteristics which cannot be said to be similar to those of a standard light source or a perfect radiator, for example, in that there are strong emission line-like components in the vicinity of 450 nm, and components in the vicinity of 480 nm are very small.

In a case where a light source having such spectral characteristics as those of the white LED is used for a flash device, when calculating a correction value of the amount of main light emission based on a color temperature difference between the main light emission and the preliminary light emission, the correction value is required to be calculated based on detailed optical spectrum data of the light source and the image pickup device. In this case, an amount of data necessary for the calculation is increased, and the calculation time is also increased.

Further, even when the optical spectrum of the light source is similar to that of a standard light source or a perfect radiator, there is a case where a shooting condition makes it difficult to calculate a correction value of the amount of main light emission with high accuracy. The following cases (1) to (5) are examples of this case:

(1) a case where the color temperature of flash light is affected by spectral reflectivity of a reflecting surface when bounce shooting is performed.

(2) a case where a large object distance or a low reflectivity of an object makes small a received amount of reflected light at the time of preliminary light emission, resulting in a lowered accuracy of photometric values.

(3) a case where a large object distance makes small the size of a main object in a shooting angle of view, resulting in a lowered accuracy of photometric values in a main object area which are obtained at the time of preliminary light emission.

(4) a case where high-magnification shooting, such as close-up shooting, makes a received amount of reflected light at the time of preliminary light emission close to a saturation level of a sensor, and a case where a received amount of reflected light is susceptible to slight movement of an object or a camera shake.

(5) a case where flash shooting under a shooting condition of a large amount of environmental light, such as daylight-synchronized shooting contribution, results in lowered contribution of flash light to photometric values obtained at the time of preliminary light emission

SUMMARY OF THE INVENTION

The present invention provides an image pickup apparatus that is capable of ensuring the accuracy of a proper main light emission amount, in a case where the emission color temperature is different between preliminary light emission and main light emission, without limiting a light source to one having spectral characteristics which are equivalent or similar to those of a standard light source or a perfect radiator, and a method of controlling the image pickup apparatus.

In a first aspect of the present invention, there is provided an image pickup apparatus comprising at least one processor, the at least one processor functioning, according to a program stored in a memory, as a photometry unit configured to measure a luminance of light reflected from an object at the time of preliminary light emission of a flash device that can change an emission color temperature by changing a ratio of light emission between a plurality of light sources which are different in emission color temperature, and a selection unit configured to select, when main light emission is performed at an emission color temperature different from a predetermined emission color temperature of first preliminary light emission, whether to perform second preliminary light emission at an emission color temperature changed according to at least one of spectral characteristics information of the light source, shooting condition information, and photometric value information obtained at the time of the first preliminary light emission, and determine a main light emission amount based on a photometric result obtained by the photometry unit at the time of the second preliminary light emission, or to determine the main light emission amount based on a photometric result obtained by the photometry unit at the time of the first preliminary light emission.

In a second aspect of the present invention, there is provided a method of controlling an image pickup apparatus using a flash device that can change an emission color temperature by changing a ratio of light emission between a plurality of light sources which are different in emission color temperature, and a photometry unit configured to measure a luminance of light reflected from an object at the time of preliminary light emission of the flash device, comprising selecting, when main light emission is performed at an emission color temperature different from a predetermined emission color temperature of first preliminary light emission, whether to perform second preliminary light emission at an emission color temperature changed according to at least one of spectral characteristics information of the light source, shooting condition information, and photometric value information obtained at the time of the first preliminary light emission, and determine a main light emission amount based on a photometric result obtained by the photometry unit at the time of the second preliminary light emission, or to determine the main light emission amount based on a photometric result obtained by the photometry unit at the time of the first preliminary light emission.

According to the present invention, in a case where the emission color temperature is different between preliminary light emission and main light emission, it is possible to sufficiently ensure the accuracy of a proper main light emission amount even when a light source having spectral characteristics which are not equivalent or similar to those of a standard light source or a perfect radiator is used.

Further features of the present invention will become apparent from the following description of exemplary embodiments (with reference to the attached drawings).

BRIEF DESCRIPTION OF THE DRAWINGS

FIGS. 2A and 2B are diagrams useful in explaining construction of a photometric sensor.

DESCRIPTION OF THE EMBODIMENTS

The present invention will now be described in detail below with reference to the accompanying drawings showing embodiments thereof.

Figure 1:
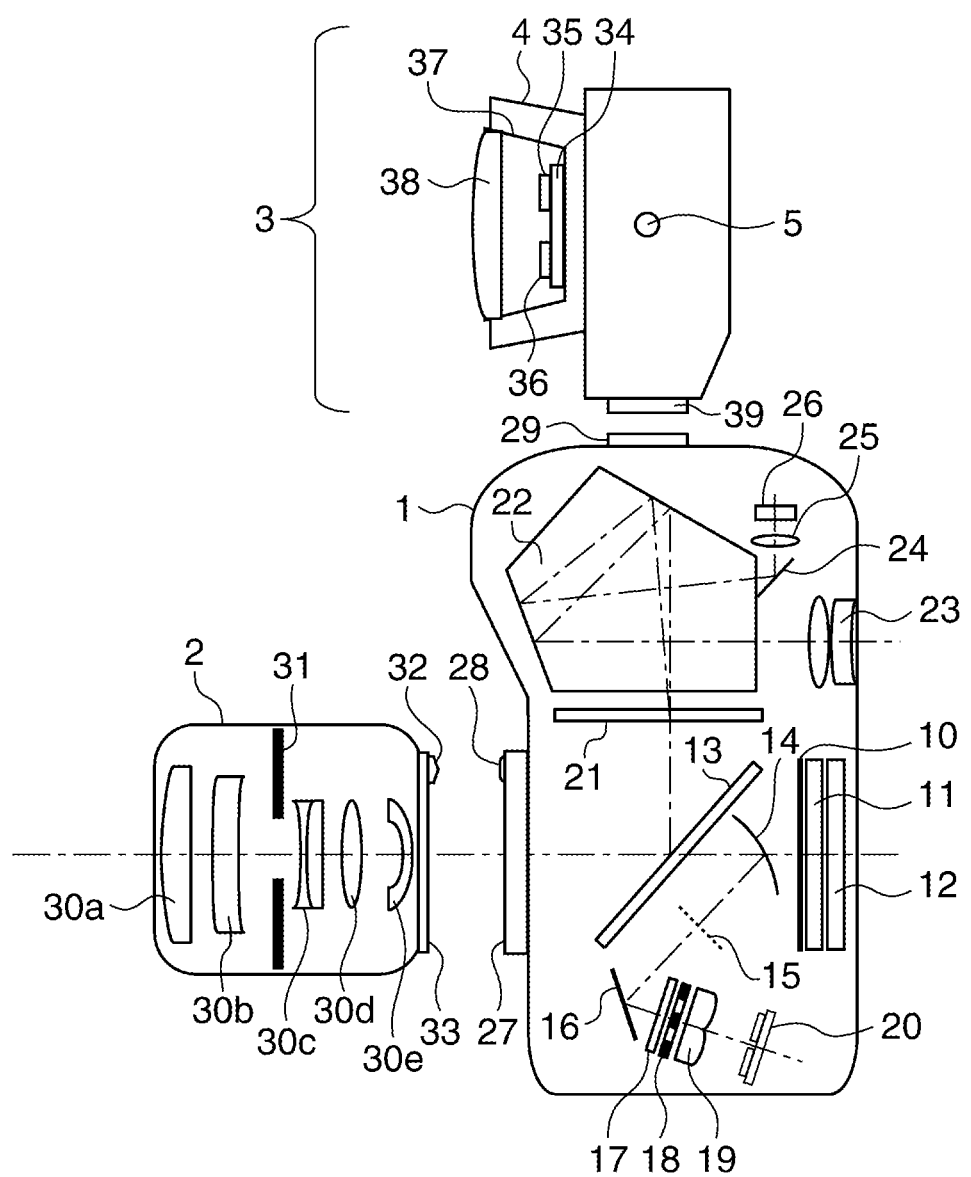
FIG. 1 is a schematic cross-sectional view of a digital single-lens reflex camera as an image pickup apparatus according to a first embodiment of the present invention.

FIG. 1 is a schematic cross-sectional view of a digital single-lens reflex camera as an image pickup apparatus according to a first embodiment of the present invention.

As shown in FIG. 1, the digital single-lens reflex camera (hereinafter referred to as the camera) according to the present embodiment has an interchangeable lens 2 removably mounted on a front side (object side) of a camera body 1 via mounts 27 and 33. In a state in which the interchangeable lens 2 is mounted, the camera body 1 can communicate information with the interchangeable lens 2 via contact portions 28 and 32. Further, on the top of the camera body 1 a flash device 3 is removably mounted via connection portions 29 and 39. The flash device 3 can change an emission color temperature by changing a ratio of light emission between a plurality of light sources which are different in the emission color temperature. Note that at least one of the interchangeable lens 2 and the flash device 3 may be provided integrally with the camera body 1.

The camera body 1 is provided with a mirror unit including a main mirror 13 which is semi-transparent and a first reflection mirror 14 which is pivotally supported on the main mirror 13. When a user observes an object through a viewfinder, the mirror unit is disposed in a mirror-down position in which the mirror unit is on a shooting optical path, whereas when shooting is performed, it is disposed in a mirror-up position in which the mirror unit is retracted from the shooting optical path.

When the mirror unit is in the mirror-down position, the main mirror 13 reflects an object light flux having passed through a shooting optical system of the interchangeable lens 2 to thereby guide the object light flux to a finder optical system, and also allows part of the object light flux to transmit therethrough to thereby guide the part of the object light flux to the first reflection mirror 14. The finder optical system is comprised of a focusing plate 21, a pentaprism 22, and an eyepiece lens 23. Part of the light flux diffused by the focusing plate 21, which is outside the optical axis and incident on a third reflection mirror 24, is reflected by the third reflection mirror 24, to be guided to a photometric sensor (shown as "AE sensor" in FIG. 4) 26 via a condensing lens 25.

FIGS. 2A and 2B are diagrams useful in explaining construction of the photometric sensor 26. The photometric sensor 26 is a sensor for obtaining information on a luminance of an object. The photometric sensor 26 is formed e.g. by an area accumulation-type photoelectric conversion element, such as a CMOS sensor or a CCD, and as shown in FIG. 2A, the photometric sensor 26 can output photometric information, such as luminance information and color information of an object, for each of a plurality of areas formed by dividing a light receiving surface.

In the present example, the plurality of divided areas are 35 areas formed by seven columns×five rows, and the divided areas are denoted by PD1 to PD35. As shown in FIG. 2B, each of the divided areas PD1 to PD35 is formed by fine light receiving pixels separate from each other, and color filters in a predetermined arrangement are provided on the light receiving pixels, respectively. In the present example, it is assumed that so-called primary color filters of B (blue), G (green), and R (red) are arranged in a Bayer array.

Referring again to FIG. 1, part of the object light flux transmitted through the main mirror 13 is reflected by the first reflection mirror 14. The reflected light flux is guided to a focus detection sensor (shown as "AF sensor" in FIG. 4) 20 via a paraxial imaging plane 15 conjugated with an image pickup surface of an image pickup device 12, referred to hereinafter, a second reflection mirror 16, an infrared cut filter 17, a diaphragm 18 having two openings, and a secondary imaging lens 19.

Figure 3:
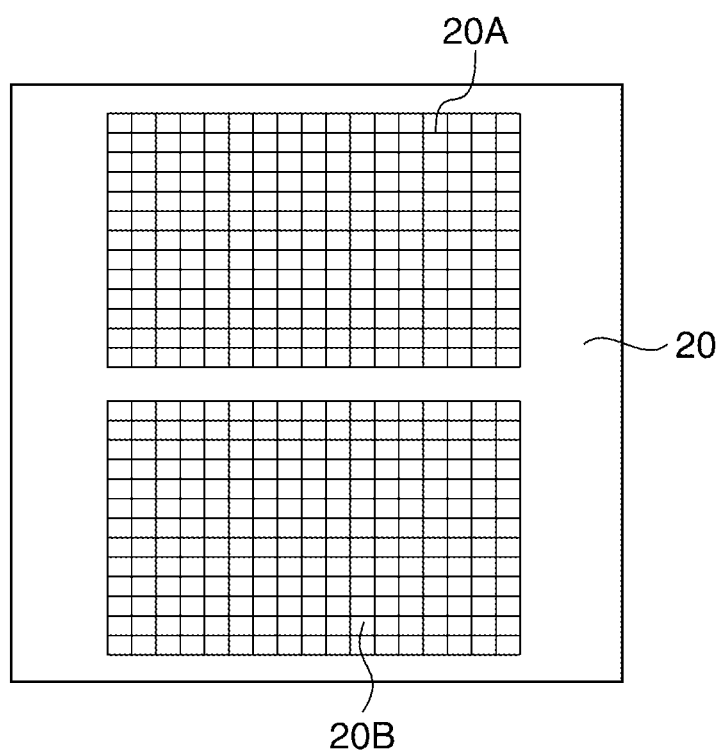
FIG. 3 is a diagram useful in explaining construction of a focus detection sensor.

FIG. 3 is a diagram useful in explaining construction of the focus detection sensor 20. The focus detection sensor 20 is formed e.g. by an area accumulation-type photoelectric conversion element, such as a CMOS sensor or a CCD, and as shown in FIG. 3, the focus detection sensor 20 includes a pair of light receiving sensor parts 20A and 20B which are each divided into a large number of light receiving areas in association with the two openings of the diaphragm 18, respectively.

Further, the focus detection sensor 20 includes not only the light receiving sensor parts 20A and 20B, but also a signal accumulation section, a peripheral circuit for processing signals, and so forth, which are arranged on the same chip as an integrated circuit. The configuration formed by the components of the first reflection mirror 14 to the focus detection sensor 20 makes it possible to perform focus detection by a focus detection method based on image deviation detected in a desired position within a shooting screen.

Referring again to FIG. 1, when the mirror unit is in the mirror-up position, the object light flux having passed through the shooting optical system of the interchangeable lens 2 is guided to the image pickup device 12 via a mechanical shutter 10 and an optical low-pass filter 11. The image pickup device 12 is formed e.g. by a CMOS sensor or a CCD, and photoelectrically converts an object image formed thereon to electric signals to thereby output the electric signals.

The interchangeable lens 2 includes not only photographic lenses 30a to 30e as components of the shooting optical system, but also a diaphragm 31, the contact portion 32 associated with the contact portion 28 of the camera body 1, and the mount 33 associated with the mount 27 of the camera body 1.

The flash device 3 includes a light emission head 4, and the light emission head 4 can be rotated about a rotational shaft 5 in a vertical direction. By turning the irradiation direction of the light emission head 4 upward, it is possible to perform bounce shooting. The light emission head 4 is provided with a circuit board 34, a low-color temperature light source 35, a high-color temperature light source 36, a reflection plate 37, and a condensing lens 38. The low-color temperature light source 35 is formed e.g. by an LED capable of light emission with a color temperature of 3000 K. The high-color temperature light source 36 is formed e.g. by an LED capable of light emission with a color temperature of 6500 K.

Figure 4:
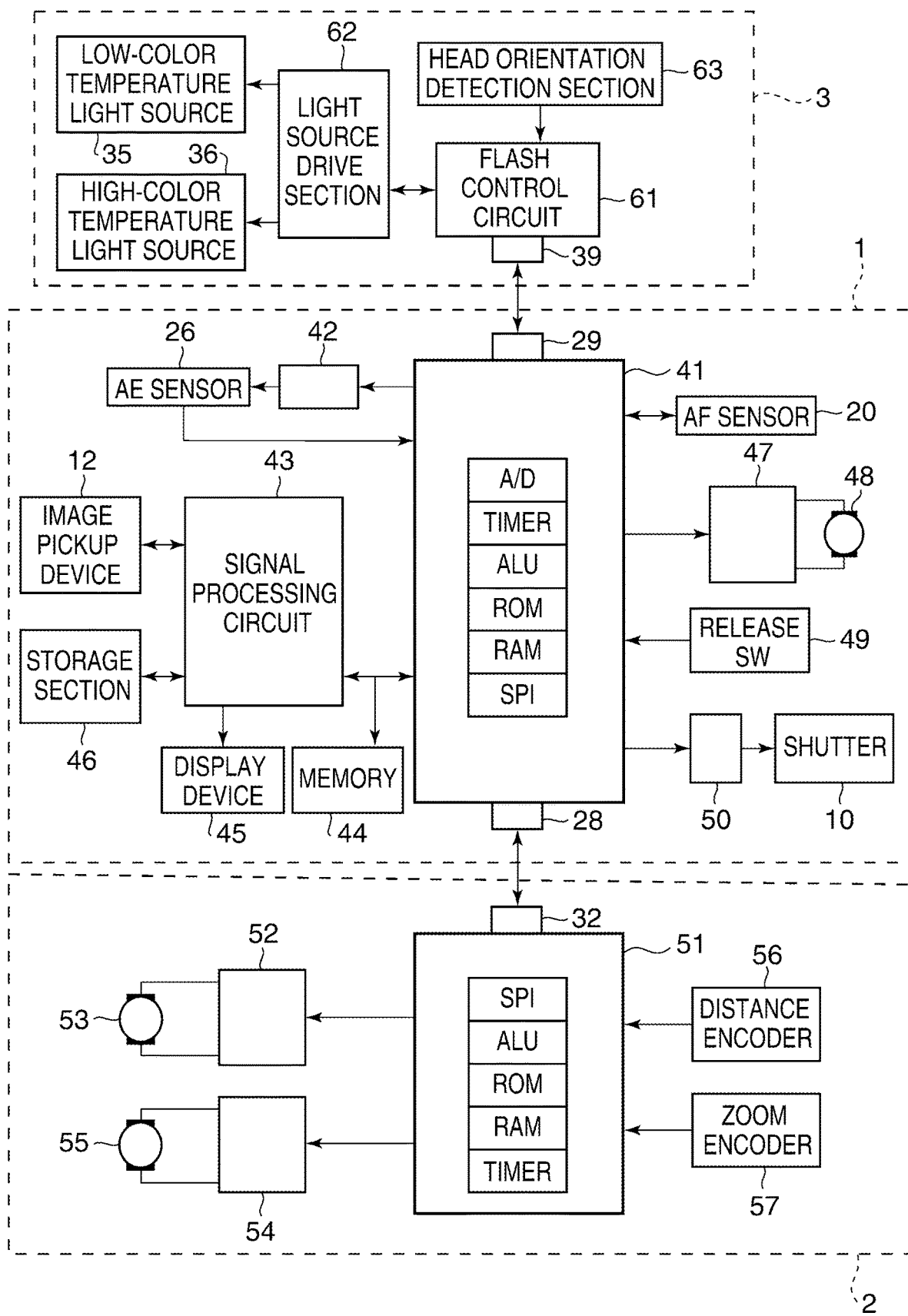
FIG. 4 is a block diagram of electric circuits of a camera body, an interchangeable lens, and a flash device.

FIG. 4 is a block diagram of electric circuits of the camera body 1, the interchangeable lens 2, and the flash device 3.

Referring to FIG. 4, first, the electric circuits of the camera body 1 will be described. In FIG. 4, a camera control circuit 41 is implemented e.g. by a one-chip microcomputer incorporating an ALU, a ROM, a RAM, an analog-to-digital converter, a timer, a serial communication port (SPI), and so forth, and controls the overall operation of the camera.

Signals output from the focus detection sensor 20 and the photometric sensor 26 are input to analog-to-digital converter input terminals of the camera control circuit 41. A timing generator 42 generates a timing signal for controlling accumulation of electric charges in the photometric sensor 26 and readout of signals from the same, and so forth.

A signal processing circuit 43 controls the image pickup device 12 according to instructions from the camera control circuit 41 to thereby perform signal processing on image pickup signals output from the image pickup device 12 after converting the image pickup signal from analog to digital, to thereby generate image signals. Further, the signal processing circuit 43 performs necessary image processing on the obtained image signals, such as compression, to record the image signals. A memory 44 is e.g. a DRAM, and is used as a work memory when the signal processing circuit 43 performing various signal processing, and is also used as a VRAM when an image is displayed on a display device 45, referred to hereinafter.

The display device 45 is formed by an LCD or the like, and is controlled to be lit and display various shooting information and shot images according to instructions from the camera control circuit 41. A storage section 46 is a flash memory, an optical disk, or the like, and stores shot image signals input from the signal processing circuit 43. A first motor driver 47 is connected to an output terminal of the camera control circuit 41, and is controlled to drive a first motor 48 for moving up and down the main mirror 13 and the first reflection mirror 14, and charging the mechanical shutter 10.

A release switch 49 is used to instruct the start of shooting. The contact portion 28 is electrically connected to the contact portion 32 of the interchangeable lens 2, and signals are input to and output from the serial communication port of the camera control circuit 41 via the contact portion 28. The connection portion 29 is a connection for connecting to the flash device 3, and signals are input to and output from the serial communication port of the camera control circuit 41 via the connection portion 29 such that the camera body 1 is capable of communicating with the flash device 3. A shutter drive circuit 50 is connected to output terminals of the camera control circuit 41, and drives the mechanical shutter 10.

Next, the electric circuit of the interchangeable lens 2 will be described. In FIG. 4, a lens control circuit 51 is implemented e.g. by a one-chip microcomputer incorporating an ALU, a ROM, a RAM, a timer, a serial communication port (SPI), and so forth. A second motor driver 52 is controlled by being connected to an output terminal of the lens control circuit 51, and drives a second motor 53 for performing focus adjustment. A third motor driver 54 is controlled by being connected to an output terminal of the lens control circuit 51, and drives a third motor 55 for operating the diaphragm 31.

A distance encoder 56 is detecting means for obtaining information on an extending amount of a focus lens of the shooting optical system, i.e. on an object distance, and is connected to an input terminal of the lens control circuit 51. A zoom encoder 57 is detection means for obtaining focal distance information during shooting in a case where the interchangeable lens 2 has a zoom function, and is connected to an input terminal of the lens control circuit 51. Signals are input to and output from the serial communication port of the lens control circuit 51 via the contact portion 32.

When the interchangeable lens 2 is attached to the camera body 1, the connections 28 and 32 of the camera body 1 and the interchangeable lens 2 are connected to each other, whereby the lens control circuit 51 is enabled to perform data communication with the camera control circuit 41. Optical information specific to a lens, which is necessary for the camera control circuit 41 to perform focus detection and exposure calculation, the object distance information from the distance encoder 56, and the focal length information from the zoom encoder 57 are output from the lens control circuit 51 to the camera control circuit 41 by data communication.

Further, focus adjustment information and aperture information, which are obtained as results of focus detection and exposure calculation performed by the camera control circuit 41, are output from the camera control circuit 41 to the lens control circuit 51 by data communication. According to the focus adjustment information and the aperture information received from the camera control circuit 41, the lens control circuit 51 controls the second motor driver 52 and the third motor driver 54, respectively.

Next, the electric circuit of the flash device 3 will be described. In FIG. 4, a flash control circuit 61 is implemented e.g. by a one-chip microcomputer incorporating an ALU, a ROM, a RAM, an analog-to-digital converter, a timer, a serial communication port (SPI), and so forth. A light source drive section 62 drives the low-color temperature light source 35 and the high-color temperature light source 36 to emit light in a predetermined light amount.

When the flash device 3 is attached to the camera body 1, the connection portions 39 and 29 of the flash device 3 and the camera body 1 are connected to each other, whereby the flash control circuit 61 is enabled to perform data communication with the camera control circuit 41. The flash control circuit 61 controls the light source drive section 62 according to the contents of communication with the camera control circuit 41, to drive the low-color temperature light source 35 and the high-color temperature light source 36 to emit light. A head orientation detection section 63 detects an orientation of the light emission head 4, and outputs a result of the detection to the flash control circuit 61.

Figure 5:
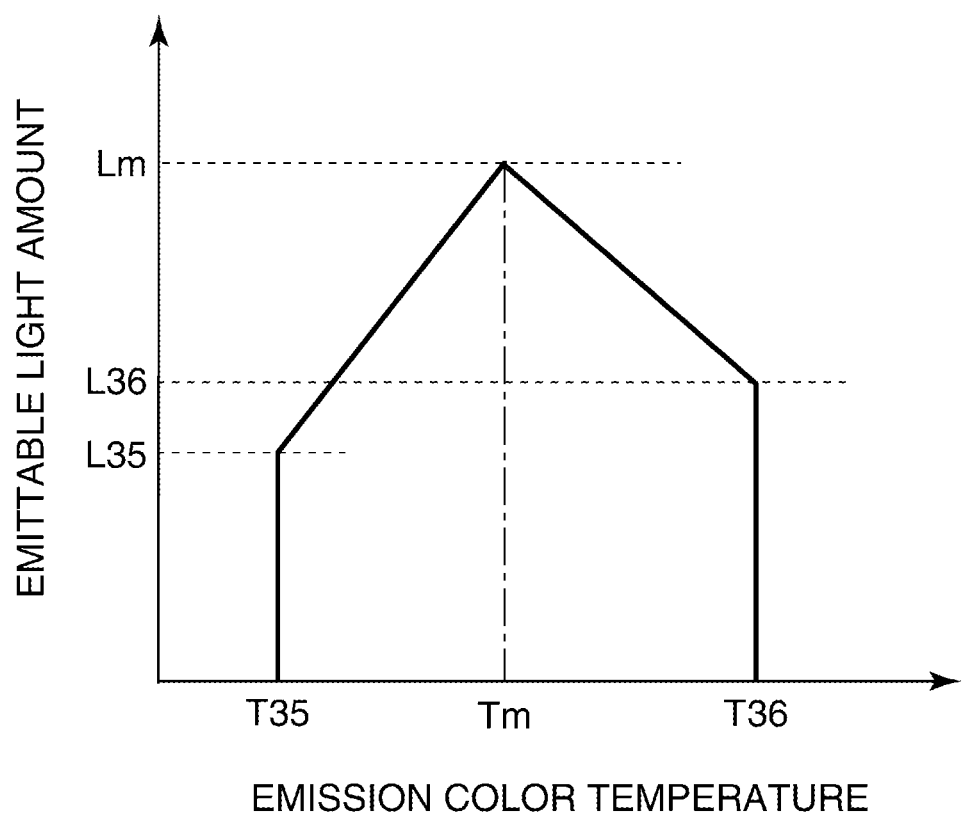
FIG. 5 is a graph showing a relationship between emission color temperatures and an emittable light amount of the flash device, based on a combination of a light emission amount of a low-color temperature light source and a light emission amount of a high-color temperature light source.

FIG. 5 is a graph showing a relationship between emission color temperatures and an emittable light amount of the flash device 3, based on a combination of a light emission amount of the low-color temperature light source 35 and a light emission amount of the high-color temperature light source 36. Referring to FIG. 5, assuming that the emission color temperature of the low-color temperature light source 35 is T35, a light emission amount L35 obtained when light is emitted only from the low-color temperature light source 35 with the maximum light emission amount is an emittable light amount available when this emission color temperature is selected. Similarly, assuming that the emission color temperature of the high-color temperature light source 36 is T36, a light emission amount L36 obtained when light is emitted only from the high-color temperature light source 36 with the maximum light emission amount is an emittable light amount available when this emission color temperature is selected.

In a case where light is emitted from both of the low-color temperature light source 35 and the high-color temperature light source 36 in the respective maximum light emission amounts, the synthesized color temperature is Tm between T35 and T36, and the emittable light amount is equal to Lm which is the sum of L35 and L36. In a range between the color temperatures T35 and Tm, the emittable light amount varies along a line connecting between L35 and Lm, and in a range between the color temperatures Tm and T36, the emittable light amount varies along a line connecting between Lm and L36.

Next, the operation of the camera at the time of flash shooting will be described with reference to FIG. 6. Each operation in an operation process in FIG. 6 is performed by the ALU and so forth by loading an associated program stored e.g. in the ROM of the camera control circuit 41 into the RAM.

Figure 6:
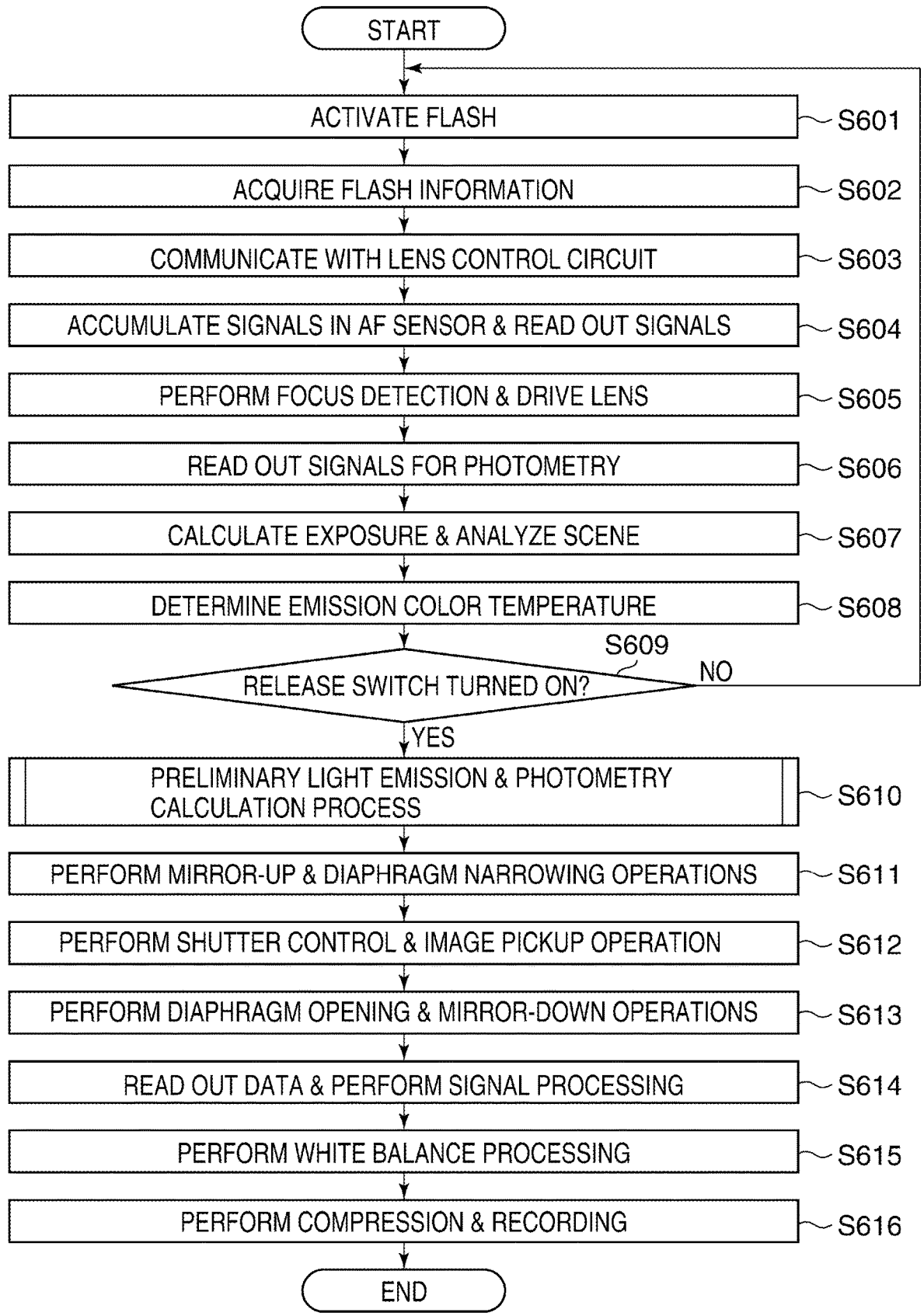
FIG. 6 is a flowchart of an operation process performed by the digital single-lens reflex camera at the time of flash shooting.

Referring to FIG. 6, in a step S601, the camera control circuit 41 activates the flash control circuit 61 to enable information communication between the camera control circuit 41 and the flash control circuit 61, and proceeds to a step S602. In the step S602, the camera control circuit 41 communicates with the flash control circuit 61 to obtain various information on specifications of flash light emission, and proceeds to a step S603. The information on the specifications of flash light emission includes the color temperature information of T35, Tm, and T36, the emittable light amounts of L35, Lm, and L36, which are described above with reference to FIG. 5, and the spectral characteristics information of the low-color temperature light source 35 and the high-color temperature light source 36. Further, the camera control circuit 41 can also acquire information on an orientation of the light emission head 4.

In the step S603, the camera control circuit 41 communicates with the lens control circuit 51 to obtain information on the lenses, which is necessary for ranging and photometry operations, and proceeds to a step S604. In the step S604, the camera control circuit 41 outputs a control signal to the focus detection sensor 20 for signal accumulation, and when the signal accumulation is terminated, the camera control circuit 41 reads out signals accumulated in the focus detection sensor 20, and converts the read signals from analog to digital. Then, the camera control circuit 41 performs various necessary data correction, such as shading, on the read digital data, and proceeds to a step S605.

In the step S605, the camera control circuit 41 determines a focusing state of each portion on the shooting screen, by calculation, based on the lens information acquired in the step S603 and the digital data acquired from the focus detection sensor 20 in the step S604. Further, the camera control circuit 41 determines an area within the shooting screen, where focusing is to be performed, and calculates a lens moving amount over which the focus lens is to be moved, according to the focusing state of the area, so to bring the determined area into a focused state. Then, the camera control circuit 41 outputs the calculated lens moving amount to the lens control circuit 51, and proceeds to a step S606. Note that if there is an area designated in advance e.g. by a user's operation as the area where focusing is to be performed, the designated area may replace the determined area mentioned above.

At this time, the lens control circuit 51 outputs a signal to the second motor driver 52 to drive the second motor 53 so as to move the focus lens to the in-focus position. With this, the focus lens is focused on the object. Note that when driving the focus lens, the information output from the distance encoder 56 is also changed, and hence the lens control circuit 51 updates the information on the lenses.

In the step S606, the camera control circuit 41 performs predetermined accumulation control and signal readout control of the photometric sensor 26 by controlling the timing generator 42. With these controls, the photometric sensor 26 accumulates electric charges for a predetermined time period, and then, accumulation signals indicative of accumulated electric charges are sequentially read out from pixels, respectively. Then, the camera control circuit 41 stores the accumulation signals sequentially read out from the pixels in the RAM after converting the signals from analog to digital, and proceeds to a step S607.

In the step S607, the camera control circuit 41 performs predetermined exposure calculation processing and scene analysis processing based on the accumulation signals stored in the RAM which are results of photometry performed by the photometric sensor 26, and proceeds to a step S608. More specifically, the camera control circuit 41 calculates an object luminance by performing the exposure calculation processing, and determines a shutter speed, an aperture value, a shooting sensitivity, and so forth, so as to take a proper exposure of an object. At the same time, the camera control circuit 41 performs the scene analysis processing to thereby detect not only the object luminance, but also object color information, whether or not flickering occurs, and so forth, and estimate a color temperature of environmental light. Note that a specific object, such as a person, may be detected.

In the step S608, the camera control circuit 41 determines an emission color temperature of the flash device 3 based on the color temperature of the environmental light and the object luminance, which are estimated and calculated, respectively, in the step S607, transmits the determined emission color temperature to the flash control circuit 61, and proceeds to a step S609. In the step S609, the camera control circuit 41 determines whether or not the release switch 49 has been turned on, and if the release switch 49 has not been turned on, the camera control circuit 41 returns to the step S601, whereas if the release switch 49 has been turned on, the camera control circuit 41 proceeds to a step S610.

In the step S610, the camera control circuit 41 performs preliminary light emission of the flash device 3 and photometry calculation at the time of the preliminary light emission, and proceeds to a step S611. Note that the process for performing preliminary light emission of the flash device 3 and photometry calculation at the time of the preliminary light emission in this step will be described in detail hereinafter with reference to FIG. 7.

In the step S611, the camera control circuit 41 outputs a control signal to the first motor driver 47 to drive the first motor 48 to move the main mirror 13 and the first reflection mirror 14 to the mirror-up position. Then, the camera control circuit 41 outputs the aperture value calculated in the step S607 to the lens control circuit 51, and proceeds to a step S612. The lens control circuit 51 outputs a control signal to the third motor driver 54 to drive the third motor 55 to drive the diaphragm 31 according to the aperture value.

In the step S612, the camera control circuit 41 performs shutter control and an image pickup operation, and proceeds to a step S613. More specifically, the camera control circuit 41 outputs a signal to the shutter drive circuit 50 to open the shutter 10. With this, an object light flux having passed through the shooting optical system enters the image pickup device 12, thereby enabling the image pickup operation. Further, the camera control circuit 41 instructs the signal processing circuit 43 such that signal accumulation is performed by setting the image pickup device 12 to accumulation time according to the shutter speed determined in the step S607 and to a readout gain according to the shooting sensitivity determined in the same step.

Further, the camera control circuit 41 instructs the flash control circuit 61 to emit flash light in synchronism with timing of the image pickup operation. Upon receipt of the light emission instruction, the flash control circuit 61 causes the low-color temperature light source 35 and the high-color temperature light source 36 to emit light in respective light emission amounts corresponding to the main light emission amount calculated in the step S610. As a result, the image pickup operation with flash light emission is performed. When the image pickup operation is terminated, the camera control circuit 41 outputs a signal to the shutter drive circuit 50 to close the shutter 10.

In the step S613, the camera control circuit 41 outputs information to the lens control circuit 51 so as to open the diaphragm 31. Upon receipt of this information, the lens control circuit 51 outputs a signal to the third motor driver 54 to drive the third motor 55 to open the diaphragm 31. With this, the diaphragm 31 is brought into the opened state. Further, the camera control circuit 41 outputs a control signal to the first motor driver 47 to drive the first motor 48 to move the main mirror 13 and the first reflection mirror 14 to the mirror-down position, and proceeds to a step S614.

In the step S614, the camera control circuit 41 reads out shot image information from the image pickup device 12 while converting the information from analog to digital, instructs the signal processing circuit 43 to perform necessary correction processing and interpolation processing on the resulting digital shot image information, and then proceeds to a step S615. In the step S615, the camera control circuit 41 instructs the signal processing circuit 43 to perform white balance adjustment on the resulting digital shot image information, and proceeds to a step S616.

More specifically, in the step S615, the camera control circuit 41 divides one screen of the shot image information into a plurality of areas, and extracts a white area of an object based on a color difference signal detected from each area. Further, the camera control circuit 41 performs gain correction of a red channel and a blue channel of the whole screen based on the signals obtained from the extracted areas to thereby perform white balance adjustment.

In the step S616, the camera control circuit 41 instructs the signal processing circuit 43 to compress and convert the shot image information on which white balance adjustment has been performed into a recording file format, and store the resulting shot image information in the storage section 46, followed by terminating the series of shooting sequence.

Next, the process for performing preliminary light emission of the flash device 3 and photometry calculation at the time of the preliminary light emission, performed in the step S610 in FIG. 6, will be described in detail with reference to FIG. 7.

Figure 7:
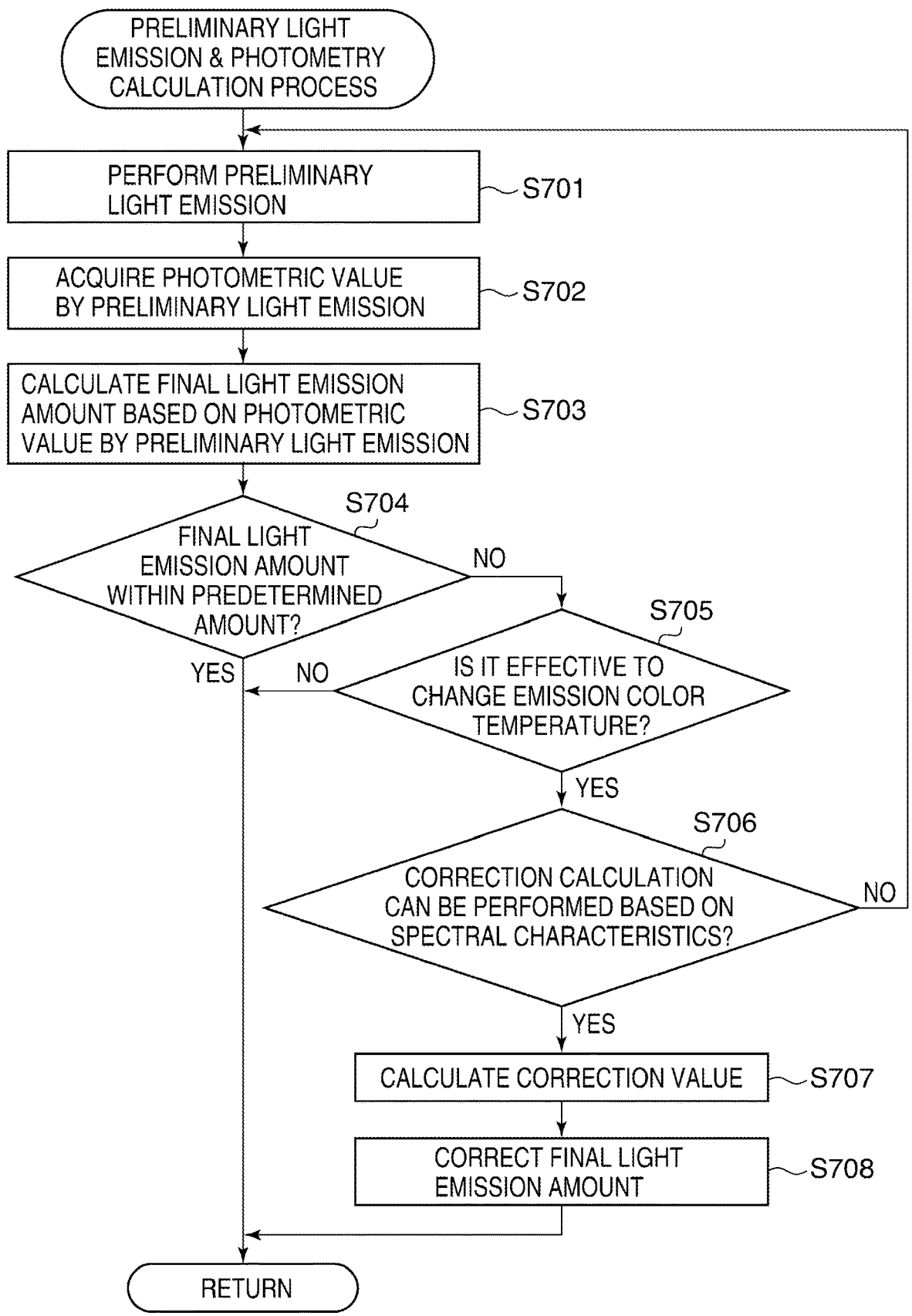
FIG. 7 is a flowchart of details of a process performed in a step in FIG. 6 for preliminary light emission of the flash device and photometry calculation at the time of the preliminary light emission.

Referring to FIG. 7, in a step S701, the camera control circuit 41 instructs the flash control circuit 61 to perform preliminary light emission in a predetermined light amount at the emission color temperature determined in the step S608 in FIG. 6, and proceeds to a step S702. Note that in the present example, the predetermined light amount is set to a light amount approximately corresponding to $\frac{1}{10}$ or $\frac{1}{20}$ of the maximum emittable light amount. According to this instruction, the flash control circuit 61 performs preliminary light emission of the flash device 3 in the predetermined light amount at a light emission amount ratio between the low-color temperature light source 35 and the high-color temperature light source 36, which is associated with the determined emission color temperature.

In the step S702, the camera control circuit 41 controls the timing generator 42 in order to obtain photometric value information of the object by the preliminary light emission, to thereby perform the predetermined accumulation control and signal readout control of the photometric sensor 26, and proceeds to a step S703. With these controls, the photometric sensor 26 accumulates electric charges for a predetermined time period, and then the camera control circuit 41 sequentially reads out the accumulation signals from the pixels while converting the signals from analog to digital, and stores the read signals in the RAM.

In the step S703, the camera control circuit 41 acquires information on an amount of light reflected from the object with respect to the light amount of the preliminary light emission, based on the accumulation signal information which was obtained by the photometric sensor 26 at the time of the preliminary light emission and stored in the RAM. Then, the camera control circuit 41 calculates a main light emission amount for performing proper exposure in main shooting, based on the information on the amount of the reflected light, as a relative light amount to the amount of light emitted for the preliminary light emission, and proceeds to a step S704.

In the step S704, the camera control circuit 41 determines whether or not the main light emission amount calculated in the step S703 is within a predetermined amount, and if it is determined that the calculated main light emission amount is within the predetermined amount, the camera control circuit 41 proceeds to the step S611 in FIG. 6, whereas if it is determined that the calculated main light emission amount is not within the predetermined amount, the camera control circuit 41 proceeds to a step S705. Here, for example, in a case where the preliminary light emission has been performed in the light emission amount corresponding to $\frac{1}{10}$ of the maximum emittable light amount, and the calculated main light emission amount is within 10 times the preliminary light emission amount, it is determined that the main light emission amount is within the predetermined amount. On the other hand, in a case where it is determined that the main light emission amount is not within the predetermined amount, there is a high possibility that even when the flash device 3 is caused to emit light in the maximum emittable light amount at the emission color temperature determined in the step S608 in FIG. 6, the exposure amount in the main shooting is definitely insufficient.

In the step S705, the camera control circuit 41 determines whether or not it is effective to change the emission color temperature to avoid insufficiency of the exposure amount. Then, if it is determined that it is not effective, the camera control circuit 41 returns to the step S611 in FIG. 6, whereas if it is determined that it is effective, the camera control circuit 41 proceeds to a step S706. Details of the determination in the step S705 will be described as follows.

As described hereinabove with reference to FIG. 5, in a case where the emission color temperature determined in the step S608 is close to T35 or T36, by making the emission color temperature closer to Tm, it is possible to increase the maximum emittable light amount. In this case, it is determined that it is effective to change the emission color temperature to avoid insufficiency of the exposure amount.

On the other hand, in a case where the emission color temperature determined in the step S608 is close to Tm, since the maximum emittable light amount cannot be increased even when the emission color temperature is changed, it is determined that it is not effective to change the emission color temperature to avoid insufficiency of the exposure amount.

In the step S706, the camera control circuit 41 determines, based on the spectral characteristics of the flash light source acquired in the step S602, whether or not it is possible to calculate, in a case where the emission color temperature is changed between the preliminary light emission and the main light emission, a correction value of the main light emission amount using the color temperature difference between the preliminary light emission and the main light emission. More specifically, in a case where the spectral characteristics information of the flash light source is information indicative of spectral characteristics similar to the spectral characteristics of a standard light source or a perfect radiator, the camera control circuit 41 determines that the correction value of the main light emission amount can be calculated, and proceeds to a step S707. On the other hand, in a case where the spectral characteristics information of the flash light source is not information indicative of spectral characteristics similar to the spectral characteristics of the standard light source or the perfect radiator, the camera control circuit 41 transmits the color temperature information at the time of the main light emission, which is changed to increase the maximum emittable light amount, to the flash control circuit 61, and returns to the step S701.

In the step S707, the camera control circuit 41 obtains amounts of change in the light receiving sensitivities of the photometric sensor 26 and the image pickup device 12 based on a difference between the color temperature information of the preliminary light emission and that of the main light emission, which is changed in order to increase the maximum emittable light amount. Then, the camera control circuit 41 calculates the correction value of the main light emission amount based on the obtained amounts of change in the light receiving sensitivities, and proceeds to a step S708.

In the step S708, the camera control circuit 41 corrects the main light emission amount calculated in the step S703 with the correction value calculated in the step S707, sets the corrected amount as the main light emission amount, and proceeds to the step S611 in FIG. 6.

As described above, in the present embodiment, in a case where the emission color temperature is different between the preliminary light emission and the main light emission, if the spectral characteristics information of the light source of the flash device 3 is information indicative of spectral characteristics similar to the spectral characteristics of the standard light source or the perfect radiator, the correction value of the main light emission amount is determined by calculation. This makes it possible to secure sufficient correction accuracy to thereby avoid wastefully repeat the preliminary light emission. Further, if the spectral characteristics information of the light source of the flash device 3 is not information indicative of spectral characteristics similar to the spectral characteristics of the standard light source or the perfect radiator, sufficient accuracy of a proper main light emission amount can be ensured by performing preliminary light emission again.

Next, a description will be given of a camera as an image pickup apparatus according to a second embodiment of the present invention with reference to FIG. 8. Note that the same component elements as those of the first embodiment are denoted by the same reference numerals.

In the present embodiment, the description is given of a method of ensuring the accuracy of a proper main light emission amount in a case where a shooting condition makes it difficult to accurately calculate the correction value, even when the spectral characteristics of the flash light source are similar to the spectral characteristics of a standard light source or a perfect radiator.

Figure 8:
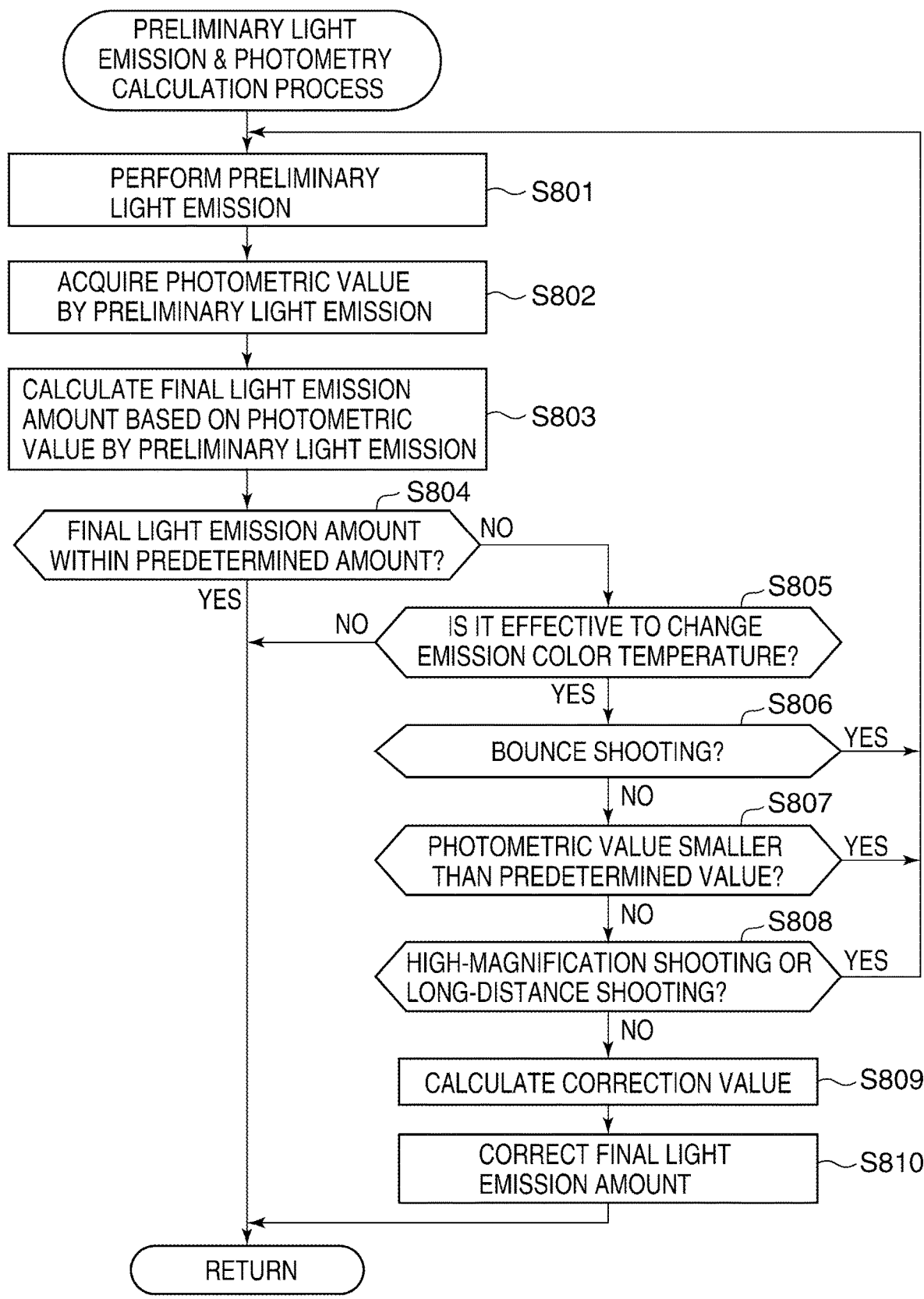
FIG. 8 is a flowchart of details of a process performed in the step in FIG. 6 for preliminary light emission of a flash device and photometry calculation at the time of the preliminary light emission, by a digital single-lens reflex camera as an image pickup apparatus according to a second embodiment of the present invention.
Figure 9:
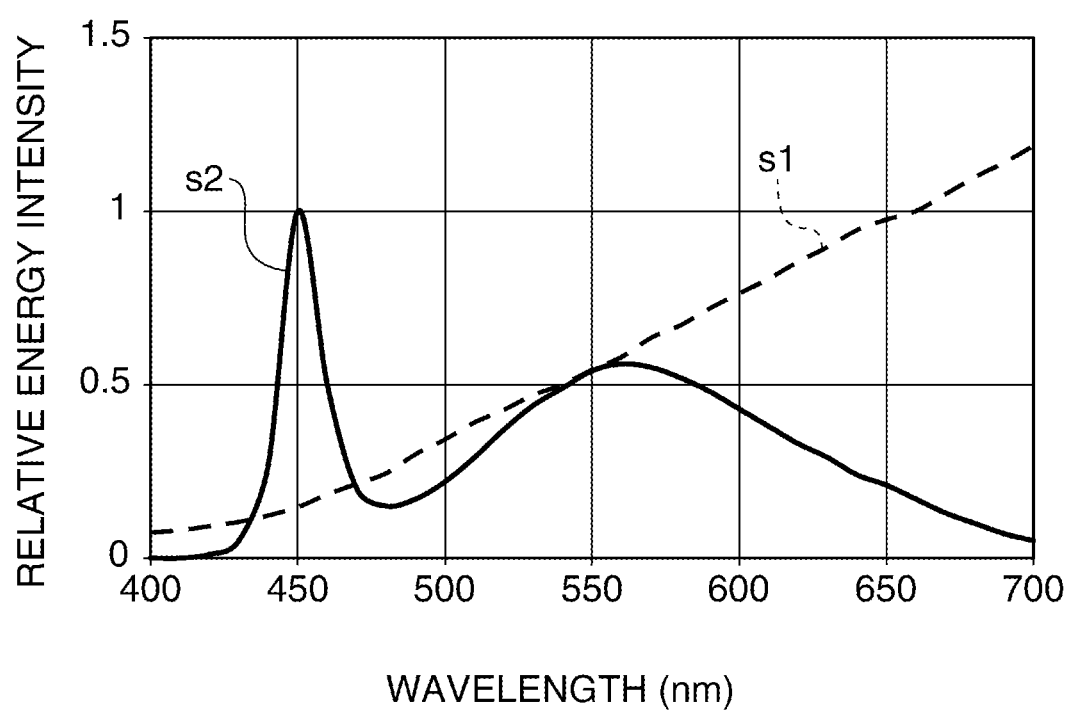
FIG. 9 is a graph showing an example of optical spectra of light sources.

FIG. 8 is a flowchart of a process for performing preliminary light emission of the flash device 3 and photometry calculation at the time of the preliminary light emission, performed in the step S610 in FIG. 6.

Referring to FIG. 8, in a step S801, the camera control circuit 41 instructs the flash control circuit 61 to perform preliminary light emission in a predetermined light amount at the emission color temperature determined in the step S608, and proceeds to a step S802. In the present example, the predetermined light amount is set to an amount approximately corresponding to $\frac{1}{10}$ or $\frac{1}{20}$ of the maximum emittable light amount. According to this instruction, the flash control circuit 61 performs preliminary light emission of the flash device 3 in the predetermined light amount at a ratio of the light emission amount between the low-color temperature light source 35 and the high-color temperature light source 36, which is associated with the determined emission color temperature.

In the step S802, the camera control circuit 41 controls the timing generator 42 in order to obtain photometric value information of the object by the preliminary light emission, to thereby perform the predetermined accumulation control and signal readout control of the photometric sensor 26, and proceeds to a step S803. With these controls, the photometric sensor 26 accumulates electric charges for a predetermined time period, and then the camera control circuit 41 sequentially reads out the accumulation signals from the pixels while converting the signals from analog to digital, and stores the read signals in the RAM.

In the step S803, the camera control circuit 41 acquires information on an amount of light reflected from the object with respect to the light amount of the preliminary light emission, based on the accumulation signal information which was obtained by the photometric sensor 26 at the time of the preliminary light emission and stored in the RAM. Then, the camera control circuit 41 calculates a main light emission amount for performing proper exposure in main shooting, based on the information on the amount of the reflected light, as a relative light amount to the amount of light emitted for the preliminary light emission, and proceeds to a step S804.

In the step S804, the camera control circuit 41 determines whether or not the main light emission amount calculated in the step S803 is within a predetermined amount, and if it is determined that the calculated main light emission amount is within the predetermined amount, the camera control circuit 41 proceeds to the step S611 in FIG. 6, whereas if it is determined that the calculated main light emission amount is not within the predetermined amount, the camera control circuit 41 proceeds to a step S805. Here, for example, in a case where the preliminary light emission has been performed in the light emission amount corresponding to $\frac{1}{10}$ of the maximum emittable light amount, and the calculated main light emission amount is within 10 times the preliminary light emission amount, it is determined that the main light emission amount is within the predetermined amount. On the other hand, in a case where it is determined that the main light emission amount is not within the predetermined amount, there is a high possibility that even when the flash device 3 is caused to emit light in the maximum emittable light amount at the emission color temperature determined in the step S608 in FIG. 6, the exposure amount in the main shooting is definitely insufficient.

In the step S805, the camera control circuit 41 determines whether or not it is effective to change the emission color temperature to avoid insufficiency of the exposure amount. Then, if it is determined that it is not effective, the camera control circuit 41 returns to the step S611 in FIG. 6, whereas if it is determined that it is effective, the camera control circuit 41 proceeds to a step S806. Details of the determination in the step S805 will be described in detail as follows.

As described hereinbefore with reference to FIG. 5, in a case where the emission color temperature determined in the step S608 is close to T35 or T36, by making the emission color temperature closer to Tm, it is possible to increase the maximum emittable light amount. In this case, it is determined that it is effective to change the emission color temperature to avoid insufficiency of the exposure amount.

On the other hand, in a case where the emission color temperature determined in the step S608 is close to Tm, since the maximum emittable light amount cannot be increased even when the emission color temperature is changed, it is determined that it is not effective to change the emission color temperature to avoid insufficiency of the exposure amount.

In the step S806, the camera control circuit 41 determines whether or not bounce shooting is to be performed based on the information on the orientation of the light emission head 4, acquired in the step S602 in FIG. 6. Then, if it is determined that the light emission head 4 is oriented toward the front, and hence bounce shooting is not to be performed, the camera control circuit 41 proceeds to a step S807. On the other hand, if it is determined that bounce shooting is to be performed, the camera control circuit 41 transmits the color temperature information to be used at the time of the main light emission, which is changed in order to increase the maximum emittable light amount, to the flash control circuit 61, and returns to the step S801.

In the step S807, the camera control circuit 41 determines whether or not the value of the accumulation signal information (photometric value) at the time of the preliminary light emission, acquired in the step S802, is smaller than a predetermined value. Assuming that the accumulation signal information at the time of the preliminary light emission is converted from analog to digital with 12-bit accuracy, if the accumulation signal information at the time of the preliminary light emission is smaller than 4LSB on average, the camera control circuit 41 determines that the value of the accumulation signal information is smaller than the predetermined value.

Then, if the value of the accumulation signal information at the time of the preliminary light emission is smaller than the predetermined value, the camera control circuit 41 transmits the color temperature information to be used at the time of the main light emission, which is changed in order to increase the maximum emittable light amount, to the flash control circuit 61, and returns to the step S801. On the other hand, if the value of the accumulation signal information at the time of the preliminary light emission is not smaller than the predetermined value, the camera control circuit 41 proceeds to a step S808.

In the step S808, the camera control circuit 41 refers to the object distance information and the focal length information output from the distance encoder 56 and the zoom encoder 57 out of the lens information acquired in the step S603 or S605 in FIG. 6. Then, after referring to these information items, the camera control circuit 41 determines whether or not the shooting condition corresponds to high-magnification shooting at a magnification not smaller than a predetermined magnification, or long-distance shooting at a distance not shorter than a predetermined distance.

For example, the shooting magnification is estimated from the object distance and the focal distance information, and if the shooting magnification is estimated to be larger than 0.5, it is determined that the shooting condition corresponds to high-magnification shooting, and if the object distance is larger than 30 m, it is determined that the shooting condition corresponds to long-distance shooting.

Then, if it is determined that the shooting condition corresponds to high-magnification shooting or long-distance shooting, the camera control circuit 41 transmits the color temperature information to be used at the time of the main light emission, which is changed in order to increase the maximum emittable light amount, to the flash control circuit 61, and returns to the step S801. On the other hand, if it is determined that the shooting condition corresponds to neither high magnification shooting nor long-distance shooting, the camera control circuit 41 proceeds to a step S809.

In the step S809, the camera control circuit 41 calculates amounts of change in the light receiving sensitivities of the photometric sensor 26 and the image pickup device 12 based on a difference between the color temperature information at the time of the preliminary light emission and that at the time of the main light emission, which is changed in order to increase the maximum emittable light amount. Then, the camera control circuit 41 calculates the correction value of the main light emission amount based on the obtained amounts of change in the light receiving sensitivities, and proceeds to a step S810.

In the step S810, the camera control circuit 41 corrects the main light emission amount calculated in the step S803 with the correction value calculated in the step S809, sets the corrected amount as the main light emission amount, and proceeds to the step S611 in FIG. 6.

As described above, in the present embodiment, when the emission color temperature is different between the preliminary light emission and the main light emission, in a case where the shooting condition permits accurate calculation of the correction value, it is possible to prevent preliminary light emission from being wastefully performed again. Further, in a case where the shooting condition makes it difficult to perform accurate calculation of the correction value, it is possible to ensure sufficient accuracy of a proper main light emission amount by performing preliminary light emission again.

Note that the present invention is not limited to the above-described embodiments, but it can be practiced in various forms, without departing from the spirit and scope thereof.

For example, as the case where the shooting condition makes it difficult to accurately calculate the correction value, there may be added a case where the received amount of reflected light at the time of preliminary light emission is close to the saturation level of the sensor, and a case where the amount of environmental light is not smaller than a predetermined amount. Further, the first embodiment and the second embodiment may be combined.

Further, in the step S706 in FIG. 7, in a case where the spectral characteristics of a light source has continuity, and do not include an emission line-like component, it may be determined that it is possible to calculate the correction value of the main light emission amount using the photometry information at the time of preliminary light emission, based on the spectral characteristics of the light source.

Further, although in the present embodiment, the color temperature is changed between the preliminary light emission and the main light emission in the case where the exposure amount is reduced due to insufficiency of the main light emission amount, the color temperature may be also changed in a case where a scene recognition result, such as environment light information, is changed, or a case where the color temperature at the time of preliminary light emission is fixed.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151741 filed Aug. 4, 2017, which is hereby incorporated by reference herein in its entirety.

What is claimed is:

1. An image pickup apparatus comprising:
   a photometry sensor;
   a memory storing instructions; and
   at least one processor that implements the instructions to execute a plurality of tasks, including:
      a photometry task that measures, using the photometry sensor, a luminance of light reflected from an object at the time of preliminary light emission of a flash device that is configurable to change an emission color temperature by changing a ratio of light emission between a plurality of light sources different in emission color temperatures; and
      a selection task that, upon main light emission being performed at an emission color temperature different from a predetermined emission color temperature of first preliminary light emission:
         selects whether to perform second preliminary light emission, after the first preliminary light emission is performed, at an emission color temperature changed according to at least one of spectral characteristics information of the light source, shooting condition information, or photometric value information obtained at the time of the first preliminary light emission; and
         determine a main light emission amount based on a photometric result obtained by the photometry task at the time of the first or second preliminary light emission.

2. The image pickup apparatus according to claim 1, wherein the plurality of tasks include a determination task that determines whether or not to change the emission color temperature at the time of the main light emission according to a result of calculation of the main light emission amount based on the photometric result obtained at the time of the first preliminary light emission.

3. The image pickup apparatus according to claim 2, wherein, in a case where the main light emission amount calculated based on the photometric result obtained at the time of the first preliminary light emission is not within a predetermined amount, the determination task determines that the emission color temperature at the time of the main light emission is to be changed.

4. The image pickup apparatus according to claim 1, wherein in a case where correction calculation of the main light emission amount is determined to be possible using the photometry information obtained at the time of the first preliminary light emission, based on spectral characteristics information of the light source, the selection task determines the main light emission amount based on the photometric result obtained at the time of the first preliminary light emission without performing the second preliminary light emission.

5. The image pickup apparatus according to claim 4, wherein in a case where the spectral characteristics of the light source have continuity, and do not include an emission line-like component, the selection task determines that the correction calculation of the main light emission amount is possible using the photometry information obtained at the time of the first preliminary light emission, based on the spectral characteristics information of the light source.

6. The image pickup apparatus according to claim 1, wherein in a case where calculation of the main light emission amount is determined to be possible using the photometry information obtained at the time of the first preliminary light emission, based on the spectral characteristics information of the light source, the selection task selects to perform the second preliminary light emission and determines the main light emission amount based on the photometric result obtained by the photometry task at the time of the second preliminary light emission.

7. The image pickup apparatus according to claim 1, wherein in a case where the shooting condition is determined to correspond to one of bounce shooting, high-magnification shooting at a magnification not smaller than a predetermined magnification or long-distance shooting at a distance not shorter than a predetermined distance, or a shooting condition having an amount of environmental light, which is not smaller than a predetermined amount, the selection task selects to perform the second preliminary light emission, and determines the main light emission amount based on the photometric result obtained by the photometry task at the time of the second preliminary light emission.

8. The image pickup apparatus according to claim 1, wherein in a case where a photometric value obtained at the time of the first preliminary light emission is smaller than a predetermined value or close to a saturation level, the selection task selects to perform the second preliminary light emission, and determines the main light emission amount based on the photometric result obtained by the photometry task at the time of the second preliminary light emission.

9. A method of controlling an image pickup apparatus using a flash device that is configurable to change an emission color temperature by changing a ratio of light emission between a plurality of light sources different in emission color temperatures, and a photometry sensor, the method comprising:
- measuring, using the photometry sensor, a luminance of light reflected from an object at the time of preliminary light emission of the flash device; and
- upon main light emission being performed at an emission color temperature different from a predetermined emission color temperature of first preliminary light emission;
    - selecting whether to perform second preliminary light emission, after the first preliminary light emission is performed, at an emission color temperature changed according to at least one of spectral characteristics information of the light source, shooting condition information, or photometric value information obtained at the time of the first preliminary light emission; and
    - determining a main light emission amount based on a photometric result obtained by the measuring at the time of the first or second preliminary light emission.

* * * * *